United States Patent
Narasimha et al.

(10) Patent No.: US 8,422,956 B2
(45) Date of Patent: Apr. 16, 2013

(54) MITIGATION OF UPLINK INTERFERENCE FROM WIRELESS COMMUNICATION DEVICE CONNECTED TO MICRO CELL

(75) Inventors: Murali Narasimha, Lake Zurich, IL (US); Ravi Kuchibhotla, Gurnee, IL (US)

(73) Assignee: Motorola Mobility LLC, Libertyville, IL (US)

( * ) Notice: Subject to any disclaimer, the term of this patent is extended or adjusted under 35 U.S.C. 154(b) by 578 days.

(21) Appl. No.: 12/542,584

(22) Filed: Aug. 17, 2009

(65) Prior Publication Data
US 2011/0039569 A1 Feb. 17, 2011

(51) Int. Cl.
*H04B 1/00* (2006.01)
(52) U.S. Cl.
USPC ........ 455/63.1; 455/450; 455/452.1; 370/329
(58) Field of Classification Search ............... 455/452.1, 455/63.1, 450; 370/329
See application file for complete search history.

(56) References Cited

U.S. PATENT DOCUMENTS

| | | | |
|---|---|---|---|
| 6,553,016 B1 | 4/2003 | Roxbergh | |
| 6,577,875 B1 | 6/2003 | Brouwer | |
| 6,865,164 B1 | 3/2005 | Scribano et al. | |
| 2006/0141999 A1* | 6/2006 | Funnell et al. ................ | 455/423 |
| 2006/0239238 A1 | 10/2006 | Fernandez-Corbaton et al. | |
| 2008/0146154 A1* | 6/2008 | Claussen et al. ............ | 455/63.1 |
| 2008/0151819 A1 | 6/2008 | Bachl et al. | |
| 2008/0166976 A1 | 7/2008 | Rao | |
| 2008/0188265 A1* | 8/2008 | Carter et al. .................. | 455/561 |
| 2009/0270109 A1 | 10/2009 | Wang Helmersson et al. | |
| 2010/0056153 A1 | 3/2010 | Attar et al. | |
| 2010/0099424 A1 | 4/2010 | Centonza | |
| 2010/0273489 A1* | 10/2010 | Narasimha ..................... | 455/436 |
| 2011/0039561 A1 | 2/2011 | Narasimha et al. | |
| 2012/0099444 A1 | 4/2012 | Hakola et al. | |

FOREIGN PATENT DOCUMENTS

| | | |
|---|---|---|
| WO | 9952226 A1 | 10/1999 |
| WO | 2008084938 A1 | 7/2008 |

OTHER PUBLICATIONS

3GPP TSG RAN WB2 #66bis, R2-094096 "LS on H(e)NB Inbound Mobility" Jun. 29-Jul. 3, 2009, Los Angeles, USA, 2 pages.
Patent Cooperation Treaty, "PCT Search Report and Written Opinion of the International Searching Authority" for International Application No. PCT/US2010/041036 Oct. 11, 2010, 13 pages.
Claussen H et al.: An overview of the femtocell concept, Bell Labs Technical Journal, Wiley, CA, US LNKD-DOI: 10.1002/BLTJ. 200292, vol. 1, No. 13, Mar. 21, 2008, pp. 221-245.
"3rd Generation Partnership Project; Technical Specification Group Radio Access Networks; FDD Home NodeB RF Requirements Work Item Technical Report (Release 8)", 3GPP Draft; TR_25.967 V2.0.0, 3rd Generation Partnership Project (3GPP), Mobile Competen.

(Continued)

*Primary Examiner* — Amancio Gonzalez (57) ABSTRACT

A wireless communication device and method wherein the device determines pathloss between the wireless communication device and the neighboring non-serving cell in response to an order from a serving cell, determines a maximum acceptable transmit power of the wireless communication device based on the pathloss, and limits a transmit power of the wireless communication device, based on a maximum acceptable transmit power, while the wireless communication device is connected to the serving cell.

2 Claims, 6 Drawing Sheets

OTHER PUBLICATIONS

"3rd Generation Partnership Project; Technical Specification Group Radio Access Networks; Home Node B Radio Frequency (RF) Requirements (FDD) (Release 9)", 3GPP Standard; 3GPP TR 25.967; 3rd Generation Partnership Project (3GPP), Mobile Competence Centre; 650, Route Des Lucioles; F-06921 Sophia-Antipolis Cedex; France, No. 9.0.0, May 1, 2009, pp. 1-55.

"3rd Generation Partnership Poject; Technical Specification Group Radio Access Network: Radio Resource Control (RRC): Protocol Specification (Release 8)", 3GPP Standard; 3GPP TS 25.331, 3rd Generation Partnership Project (3GPP), Mobile Competence Centre; 650, Route Des Lucioles; F-06921 Sophia-Antipolis Cedex; Ffrance, No. V8.3.0. May 1, 2008, pp. 1-1494.

Texas Instrucments Inc.: "Enabling DL reception of system and control information from Intra frequency neighbors without gaps in the serving cell": 3GPP Draft; R2-071266_ENABLING_DL_RX_WO_RECEPTION GAPS, 3rd Generation Partnership Project (3GPP), Mobile Competence Centre 650, Route Des Lucioles; F-06921 Sophia-Antipolis Cedex; France, vol. RAN WG2, no. St. Julian: 20070322, Mar. 22, 2007; [retrieved on Mar. 22, 2007].

United States Patent and Trademark Office, Non-Final Office Action; U.S. Appl. No. 12/542,572 dated Dec. 8, 2011, 13 pages.

United States Patent and Trademark Office, Notice of Allowance and Fee(s) Due; U.S. Appl. No. 12/542,572 dated Aug. 17, 2012, 11 pages.

United States Patent and Trademark Office, Notice of Allowance and Fee(s) Due for U.S. Appl. No. 12/542,572 dated Sep. 14, 2012, 13 pages.

* cited by examiner (PRIOR ART)

MITIGATION OF UPLINK INTERFERENCE FROM WIRELESS COMMUNICATION DEVICE CONNECTED TO MICRO CELL

FIELD OF THE DISCLOSURE

The present disclosure relates generally to wireless communications and, more specifically, to mitigation of uplink interference from wireless communication devices connected to micro cells, for example, picocells and femtocells, and corresponding methods.

BACKGROUND

One of the deployment configurations for Third Generation Partnership Project (3GPP) Long Term Evolution (LTE) Closed Subscriber Group (CSG) cells is to have macro cells and CSG cells operate on the same carrier frequency. Such operation is referred to as shared carrier deployment. Generally, a network tries to keep a user equipment (UE) connected to the strongest cell at any given location. CSG cells are also referred to as Home eNode B (HeNB) in 3GPP LTE parlance and may also be referred to more generally as micro cells including but not limited to picocells and femtocells. Some micro cells provide access to only members and other micro cells provide preferred access to members and open access to non-members. Thus, a UE is handed over from one cell to another only when the other cell is stronger than the original cell. However, in a shared carrier deployment this assumption is not valid.

CSG cells provide member users with specialized services and the general expectation is that the coverage area of a CSG cell is large enough to accommodate its member users. For example, the coverage areas of the CSG cell may be sufficiently large to accommodate users in a home environment. However, if a CSG cell is located too near a macro cell, the macro cell could be the stronger cell when the UE is within the intended coverage area of the CSG cell. This issue may arise, for example, if the CSG cell is within approximately 100-150 meters or more from a macro cell site depending on the relative transmit powers of the macro and CGS cells. The result is a potentially unacceptably small coverage area for the CSG cell, making deployment of CSG cells within a certain radius of the macro cell site impractical. In order to prevent this undesirable effect, it is necessary to be able to handover a UE to the CSG cell even when the CSG cell is not the strongest cell.

Figure 1:
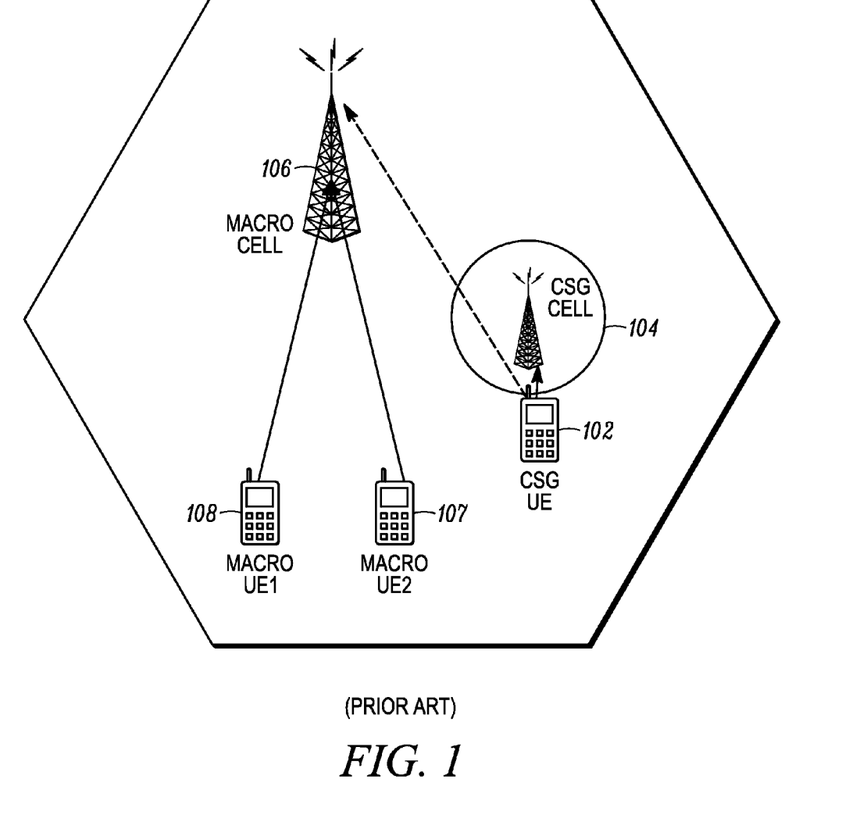
FIG. 1 is a prior art illustration of a portion of a wireless communication system including a macro cell and a neighboring micro cell.

One consequence of handover of a UE to a CSG cell that is not the strongest cell is that downlink interference from the strongest cell and uplink interference to the strongest cell can be significant. FIG. 1 illustrates uplink interference caused by a UE in such a scenario. The CSG UE 102 is connected to a CSG cell 104 although a signal from a macro cell base station 106 is stronger than the signal from the CSG cell. In FIG. 1, uplink transmissions from the CSG UE 102 can cause uplink interference to macro cell UEs, for example, to UE1 and UE2. The macro cell ensures orthogonality of uplink transmissions of UEs connected to the macro cell. That is, the macro cell performs resource allocation such that macro cell UEs do not cause uplink interference with each other. The uplink transmissions to different cells, for example, transmissions from the CSG UE 102 to the neighboring CSG cell 104 in FIG. 1 however cannot be orthogonalized relative to transmissions in the macro cell. Thus UE transmissions to the CSG cell can cause significant uplink interference to macro cell UEs.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

According to one aspect of the disclosure, generally, the transmit power of a wireless communication device, also referred to herein as user equipment (UE), connected to a serving cell is reduced to avoid or at least reduce interference with uplink transmissions by neighboring UE, using the same or overlapping radio resources, connected to a neighboring cell. In FIG. 1, for example, the CSG cell 104 is located proximate or near a macro cell 106 such that uplink transmissions from a UE 102 connected to the CSG cell 104 may interfere with uplink transmissions from UE 107 and UE 108, using the same or overlapping radio resources, connected to the neighboring macro cell 106. To mitigate this problem, in some instances, the maximum transmit power of the UE 102 connected to the CSG cell 104 is reduced to avoid or at least reduce interference with UE 107 and UE 108 connected to macro cell 106.

The following equation can be used to determine the maximum allowable transmit power of the CSG UE 102:

$$(TxPwr_{MUE} - PL_{MUEtoMacro}) - (TxPwr_{CSGUE} - PL_{CSGUEtoMacro}) \geq SNR_{tgt}$$

$$\Rightarrow TxPwr_{CSGUE} \leq Tx_{PwrMUE} - PL_{MUEtoMacro} - SNR_{tgt} + PL_{CSGUEtoMacro}$$

where $TxPwr_{MUE}$ is the transmit power of a macro cell UE 107, 108, $TxPwr_{CSGUE}$ is the transmit power of a CSG cell UE 102, $PL_{MUEtoMacro}$ is the pathloss from the macro cell UE to the macro cell, and $PL_{CSGUEtoMacro}$ is the pathloss from the CSG cell UE to the macro cell.

More generally, the principles disclosed herein may be used to avoid or at least reduce uplink interference caused by a first UE connected to a first serving base station with neighboring UE, using the same or overlapping radio resources, connected to a neighboring base station as discussed more fully below. For example, the equation above is applicable to any wireless communication device for which it is desirable to limit the uplink transmission power to avoid or reduce interference with uplink transmissions on the same or overlapping radio resources by neighboring devices on a neighboring cell.

If necessary, to compensate for the reduced uplink transmit power configuration of the wireless communication device, the serving cell, for example, the CSG cell, can use one or more of the following approaches: allocate additional time-frequency resources for packets; reduce uplink packet sizes; allow more HARQ retransmissions, or use TTI bundling on the uplink.

The wireless communication system in FIG. 1 may be embodied as any wireless communication system that employs base stations serving wireless communication devices over corresponding geographical regions or cells wherein neighboring base stations utilize the same or overlapping radio resources in the time and/or frequency domain. The base station or cell to which a wireless communication device or UE is connected is referred to as the serving cell relative to the UE. In one implementation, the wireless communication system with which the teachings of the instant disclosure is applicable is compliant with the Third Generation Partnership Project (3GPP) Universal Mobile Telecommunications System (UMTS) Long Term Evolution (LTE) protocol, also referred to as EUTRA or LTE Release-8 (Rel-8) or a later version thereof. In another implementation, the wireless communication system is compliant with the IEEE 802.16 fixed or mobile WiMAX protocol or some later version thereof. In other implementations, more generally, the wireless communication system is compliant with any other existing or future open or proprietary wireless communication protocol.

In FIG. 1, the CSG cell 104 and the macro cell 106 may be referred to generally as base stations or cells. The base station or cell may be embodied as a macro cell, a micro cell, a relay node (RN), or access point (AP). The BS generally comprises one or more transmitters for downlink transmissions and one or more receivers for receiving uplink transmissions. In some embodiments, the base station is generally part of a radio access network that includes one or more controllers communicably coupled to one or more corresponding base units. The access network is generally communicably coupled to one or more core networks, which may be coupled to other networks like the Internet and public switched telephone networks, among other networks. These and other elements of access and core networks are not illustrated but they are well known generally by those having ordinary skill in the art. The particular implementation of the network infrastructure beyond the base station however is not particularly relevant to the instant disclosure and to the extent that it is it will be described further below.

In the exemplary embodiment below, a wireless communication device connected to a first serving cell switches its link over from the first serving cell to a second serving cell and limits its uplink transmit power when connected to the second serving cell to avoid or reduce interference with UE connected to the first serving cell. In the context of FIG. 1, the first serving cell is a macro cell and the second serving cell is a micro cell, for example, a Closed Subscriber Group (CSG) cell. The switching may be a hard or soft handover. In a hard handover, the connection with the first serving cell is broken before establishment of the connection with the second serving cell. In a soft handover, the connection with the second serving cell is established before breaking the connection with the first serving cell. A serving cell is a cell with which the wireless communication device has a two-way communication link. A non-serving cell is a cell with which the wireless communication device does not have two-way communication link. For example, a non-serving cell may be a cell with which the wireless communication device does not have two-way communication link but has a one-way communication link such as a link to receive system information from the cell.

Figure 2:
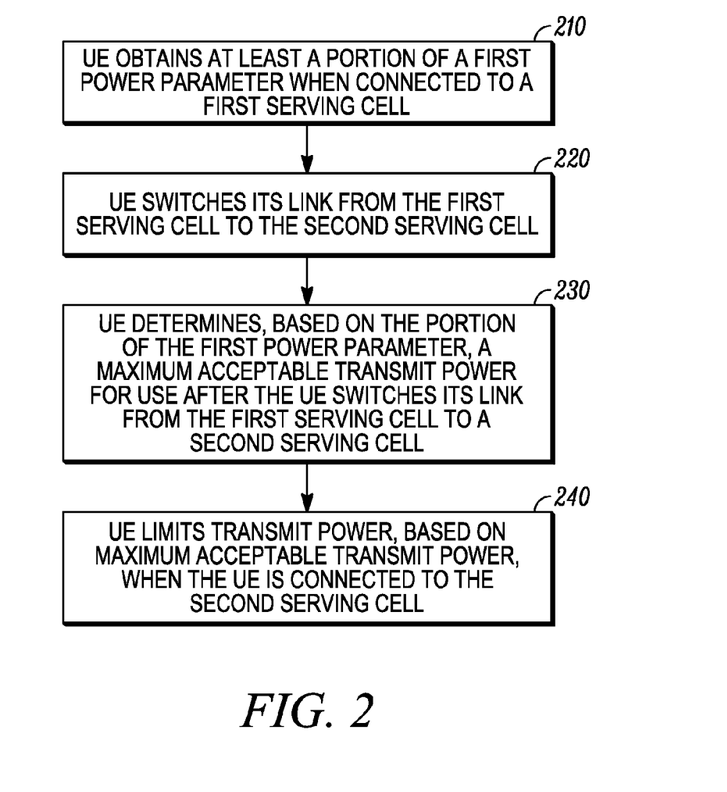
FIG. 2 illustrates a first process flow diagram.

In FIG. 2, at 210, the wireless communication device (UE) obtains at least a portion of a power parameter when connected to a first serving cell. The power parameter is a generally parameter that can be used to derive a transmit power of the first serving cell. In one embodiment, the power parameter is a single pre-computed value that is based on multiple elements or parameters. For example, the power parameter can be a pathloss, or a base station transmit power, or an SNR, or a combination of these or other parameters.

At 220, the wireless communication device switches its link from the first serving cell to a second serving cell. At 230, the wireless communication device determines a maximum acceptable transmit power for use by the wireless communication device when the wireless communication device is connected to the second serving cell after switching its link. The maximum acceptable transmit power is based on the portion of the power parameter. In some embodiments, it may be possible to compute the maximum transmit power before switching as discussed further below. At 240, the transmit power of the wireless communication device is limited, based on the maximum acceptable transmit power, when the wireless communication device is connected to the second serving cell.

Figure 3:
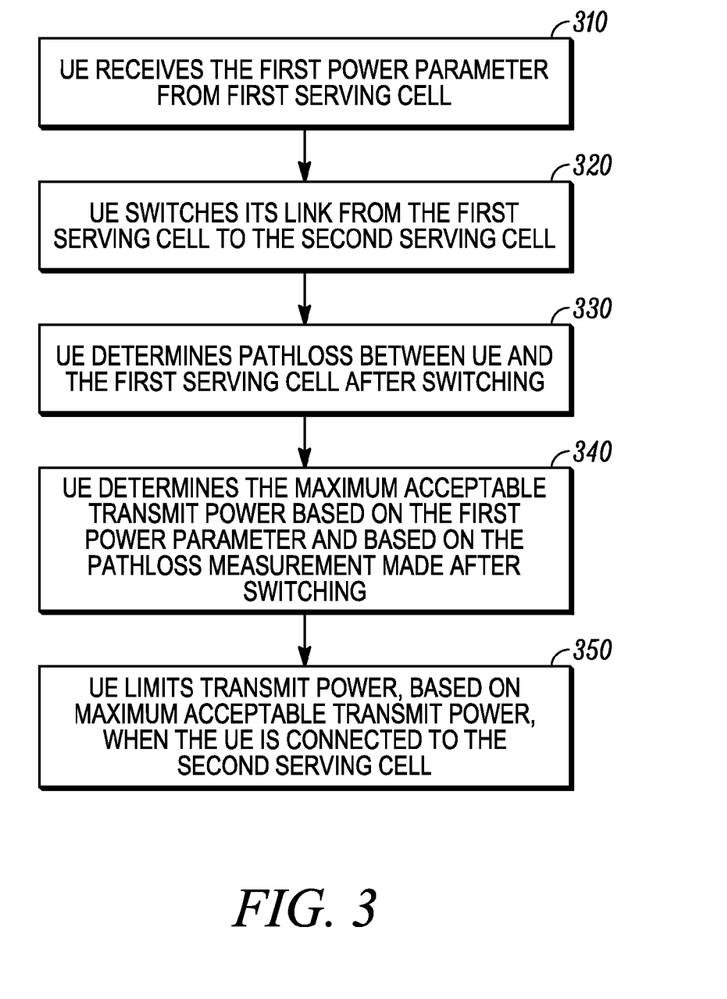
FIG. 3 illustrates a second process flow diagram.

In a more particular implementation, the wireless communication device obtains the portion of the power parameter from the first serving cell before switching over to the second serving cell. In FIG. 3, at 310, more specifically, the wireless communication device receives the power parameter from the first serving cell. In this embodiment, the power parameter includes the portion of the power parameter aggregated with other information, wherein the aggregation at least partially constitutes the power parameter. The power parameter may be transmitted in a broadcast message like a system information message or alternatively it could be transmitted in a dedicated message like a handover message. The power parameter comprises a transmit power of the wireless communication device, a path loss from the wireless communication device to the first serving cell before switching, and a target signal to noise ratio (SNR) of the first serving cell. In one embodiment, the power parameter is expressed as Tx−PL−SNR, where Tx is a transmit power of another wireless communication device, for example, UE 107 or UE 108 in FIG. 1, to the first serving cell, PL is a pathloss of the another wireless communication device relative to the first serving cell, and SNR is a target SNR of the first serving cell. The target SNR may be signaled to the wireless communication device or it may be a fixed value provisioned in the device. The target SNR may be zero.

In another embodiment, the power parameter is expressed as Tx−PL−SNR, where Tx is a transmit power of the wireless communication device, for example, UE 102 in FIG. 1, to the first serving cell before, PL is a pathloss of the wireless communication device relative to the first serving cell before switching, and SNR is a target SNR of the first serving cell. The target SNR may be signaled to the wireless communication device or it may be a fixed value provisioned in the device. The target SNR may be zero.

The wireless communication device generally determines the maximum acceptable transmit power based on the power parameter and based on a path loss from the wireless communication device to the first serving cell after switching. In FIG. 3, at 320, the wireless communication device switches its link from the first serving cell to the second serving cell. At 330, the wireless communication device determines pathloss between the wireless communication device and the first serving cell after switching. The pathloss between the wireless communication device and the serving cell is determined as a difference between the transmit power of the serving cell and the reference signal received power (RSRP) measured by the device. The computation of pathloss, or the taking or making of a pathloss measurement, in a wireless communication device relative to a reference transmitter is known generally by those of ordinary skill in the art as not discussed further herein.

In FIG. 3, at 340, the wireless communication device determines the maximum acceptable transmit power based on the power parameter and based on the pathloss measurement made after switching. In embodiments where there is little or no change in position of the UE when the pathloss measurements are made before and after switching, it may be possible to compute the maximum transmit power before switching, since in these embodiments the pathloss before and after switching will be unchanged or substantially unchanged.

In embodiments where the UE is at substantially the exactly the same location before and after the handover, the pathloss before and after handover is the substantially the same. Under these circumstances, the maximum transmit power limit can be determined as Tx–SNR, where Tx is a transmit power of the wireless communication device (102) to the first serving cell and SNR is a target SNR of the first serving cell.

In FIG. 3, at 350, the transmit power of the wireless communication device is limited, based on the maximum transmit power, when the device is connected to the second serving cell. Generally the transmit power of the wireless communication device is maintained at or below the maximum transmit power when the device is connected to the second serving base station thereby limiting the impact on uplink communications in neighboring cells.

In a practical implementation, the wireless communication device includes a digitally programmable controller coupled to a transceiver wherein the controller is configurable by software or firmware or drivers to perform the functionality described herein. In the embodiment of FIG. 3, for example, the controller may be configured to cause the reception of the power parameter from the serving cell, to switch the communication link from one cell to another, to determine pathloss, determine the maximum acceptable transmit power, and to limit the transmit power of the device. In alternative embodiments, equivalent hardware or a combination of hardware and software may be used to implement the functionality described herein.

Figure 4:
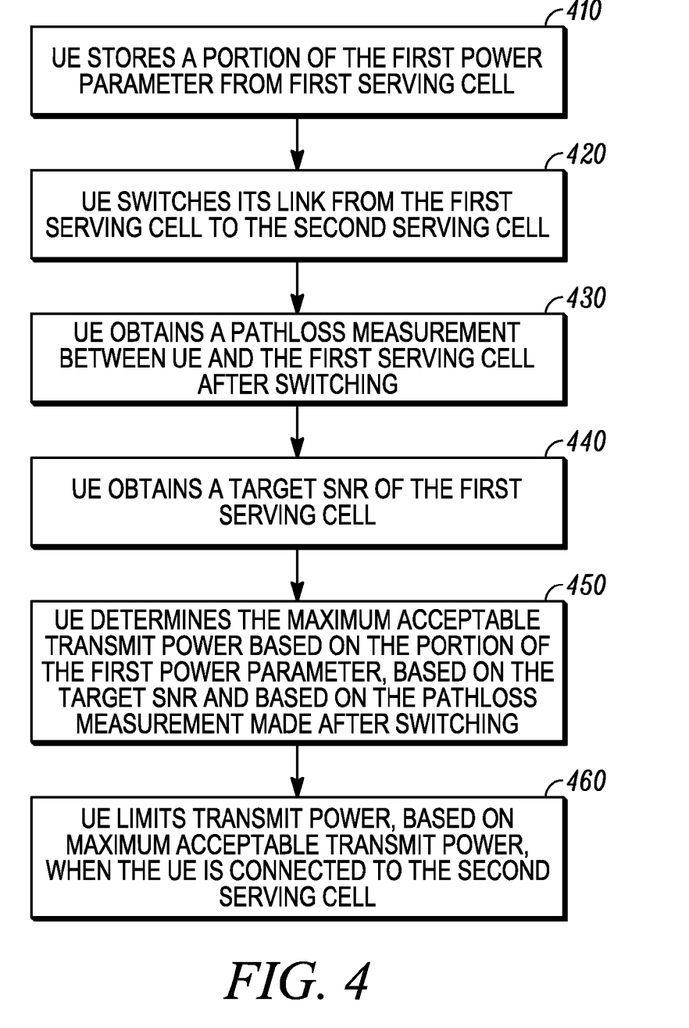
FIG. 4 illustrates a third process flow diagram.

In another more particular implementation, illustrated in FIG. 4, at 410, the wireless communication device obtains the portion of the power parameter by storing the portion of the power parameter on the wireless communication device. In this embodiment, the portion of the power parameter comprises a transmit power of the wireless communication device and a path loss from the wireless communication device to the first serving cell before switching. Particularly, the portion of the power parameters is expressed as Tx–PL, where Tx is a transmit power of the wireless communication device to the first serving cell, PL is a pathloss of the wireless communication device relative to the first serving cell before switching.

The wireless communication device generally determines the maximum acceptable transmit power based on the power parameter and based on a path loss from the wireless communication device to the first serving cell after switching. In FIG. 4, at 420, the wireless communication device switches its link from the first serving cell to the second serving cell. At 430, the wireless communication device determines pathloss between the wireless communication device and the first serving cell after switching. A 440, the wireless communication device obtains a target signal to noise ratio (SNR) of the first serving cell. The target SNR may be signaled from a serving cell or from a non-serving cell or it may be a fixed value stored on the device. Thus in some embodiments, the SNR may be obtained before switching at 420. At 450, the wireless communication device determines the maximum acceptable transmit power based on the portion of the power parameter, based on the target SNR, and based on a path loss from the wireless communication device to the first serving cell after switching. In FIG. 4, at 460, the transmit power of the wireless communication device is limited, based on the maximum transmit power, when the device is connected to the second serving cell. Generally the transmit power of the wireless communication device is maintained at or below the maximum transmit power when the device is connected to the second serving base station thereby limiting the affect on uplink communications in neighboring cells.

In a practical implementation, the wireless communication device includes a digitally programmable controller coupled to a transceiver wherein the controller is configurable by software or firmware or drivers to perform the functionality described herein. In the embodiment of FIG. 4, for example, the controller may be configured to cause the reception of the power parameter from the serving cell, to switch the communication link from one cell to another, to obtain pathloss and SNR information, to determine the maximum acceptable transmit power, and to limit the transmit power of the device. In alternative embodiments, equivalent hardware or a combination of hardware and software may be used to implement the functionality described herein.

Figure 5:
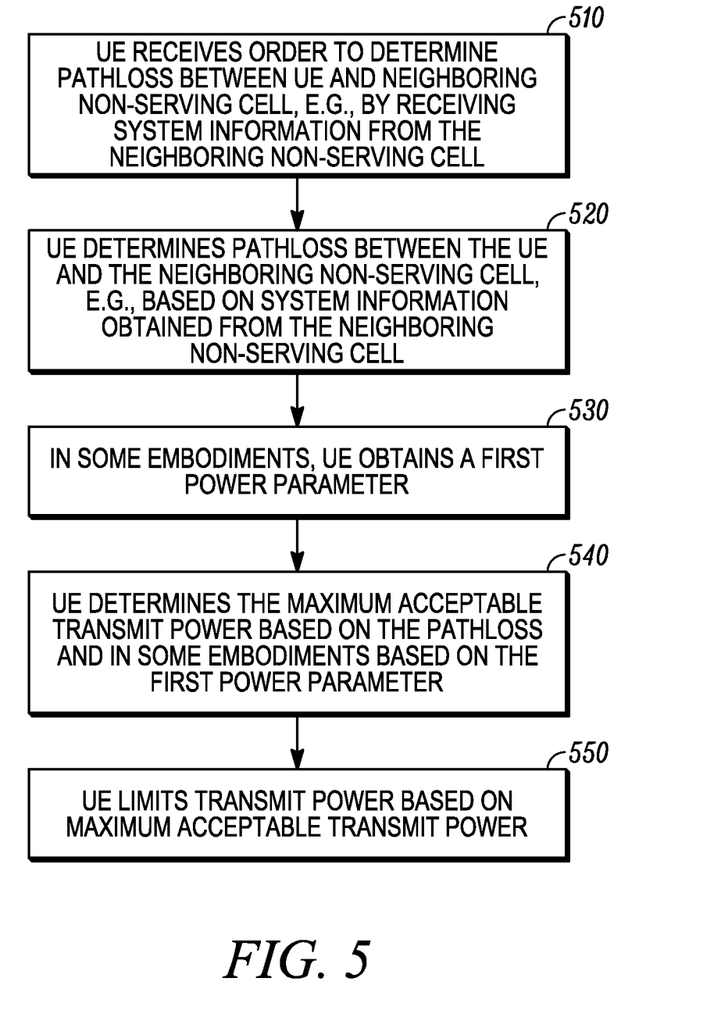
FIG. 5 illustrates a fourth process flow diagram.

In yet another implementation, illustrated in FIG. 5 at 510, the wireless communication device receives, from a serving cell, an order to determine pathloss between the device and a neighboring non-serving cell. In one implementation, the wireless communication device determines the pathloss based on system information received or acquired from the neighboring non-serving cell. In FIG. 1, for example, wireless communication device 102 connected to the CSG cell 104 receives an order from the CSG cell 104 to obtain system information from the neighboring macro cell 106. At 520, the wireless communication device determines pathloss between the wireless communication device and the neighboring non-serving cell.

In some embodiments, illustrated in FIG. 5 at 530, the wireless communication device obtains a power parameter. In one embodiment, the power parameter is received from the neighboring non-serving cell. The power parameter is a parameter that can be used to determine a transmit power that minimizes interference to the neighboring non-serving cell. Generally, the power parameter may be expressed as Tx–PL–SNR, where Tx is a transmit power of the wireless communication device to the serving cell, PL is a pathloss of the wireless communication device relative to the serving cell, and SNR is a target SNR of the serving cell. The target SNR may be signaled to the wireless communication device or it may be a fixed value provisioned in the device.

In FIG. 5, at 540, the wireless communication device determines the maximum acceptable transmit power of the wireless communication device based on the pathloss and in some embodiments also based on the power parameter. At 550, transmit power of the wireless communication device is limited based on the maximum acceptable transmit power when the wireless communication device is connected to the serving cell.

In a practical implementation, the wireless communication device includes a digitally programmable controller coupled to a transceiver wherein the controller is configurable by software or firmware or drivers to perform the functionality described herein. In the embodiment of FIG. 5, for example, the controller may be configured to cause the reception of the order to determine pathloss from the serving cell, to determine pathloss and to obtain a power parameter if necessary, to determine the maximum acceptable transmit power, and to limit the transmit power of the device. In alternative embodiments, equivalent hardware or a combination of hardware and software may be used to implement the functionality described herein.

Figure 6:
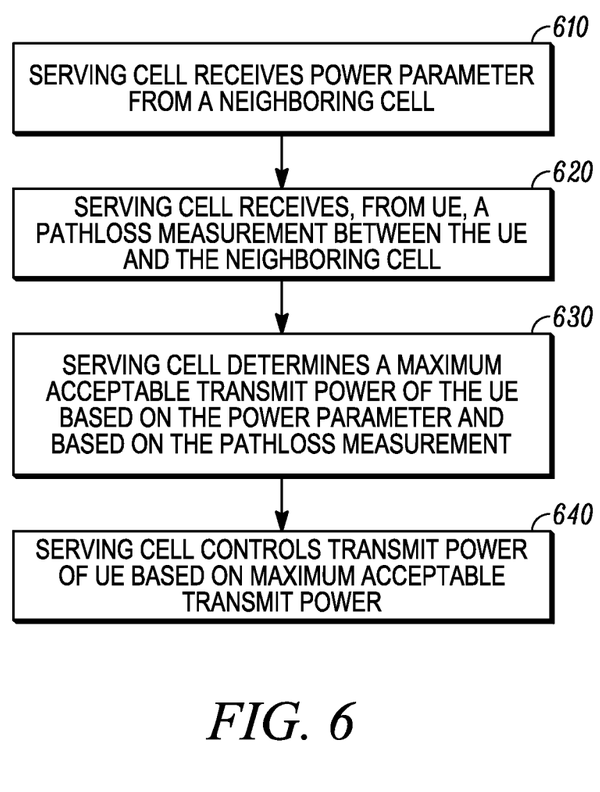
FIG. 6 illustrates another process flow diagram.

The operation of the third implementation is now described from the perspective of the serving base station or cell, for example, from the perspective of the CSG cell 104 in FIG. 1. In FIG. 6, at 610, the serving cell receives a power parameter from a neighboring cell. In FIG. 1, for example, the CSG cell 104 receives the power parameter from the macro cell 106. The power parameter is expressed as Tx−PL−SNR, where Tx is a transmit power of another wireless communication device (e.g., UE 107 or UE 108 in FIG. 1) to the neighboring cell, PL is a pathloss of the another wireless communication device relative to the neighboring cell, and SNR is a target SNR of the neighboring cell.

In FIG. 6, at 620, the serving cell receives, from a wireless communication device served by the serving cell, a pathloss measurement wherein the pathloss is measured between the wireless communication device and the neighboring cell. In FIG. 1, for example, the UE 102 sends a pathloss measurement between UE 102 and macro cell 106 to CSG cell 104. In FIG. 6, at 630, the serving cell determines a maximum acceptable transmit power of the wireless communication device based on the power parameter and based on the pathloss measurement. At 640, the serving cell controls the transmit power of the wireless communication device based on the maximum acceptable transmit power when the wireless communication device is connected to the serving cell.

In a practical implementation, the base station or eNB includes a digitally programmable controller coupled to a transceiver wherein the controller is configurable by software or firmware or drivers to perform the functionality described herein. In the embodiment of FIG. 6, for example, the controller may be configured to cause the reception of the power parameter and pathloss information, to determine the maximum acceptable transmit power, and to limit the transmit power of a wireless communication device served by the eNB. In alternative embodiments, equivalent hardware or a combination of hardware and software may be used to implement the functionality described herein.

While the present disclosure and the best modes thereof have been described in a manner establishing possession and enabling those of ordinary skill to make and use the same, it will be understood and appreciated that there are equivalents to the exemplary embodiments herein and that modifications and variations may be made thereto without departing from the scope and spirit of the inventions, which are to be limited not by the exemplary embodiments but by the appended claims.

What is claimed is:

1. A method in a wireless communication base station, the method comprising:
  receiving a power parameter from a neighboring cell;
  receiving a pathloss measurement from a first wireless communication device, the pathloss measured between the first wireless communication device and the neighboring cell;
  determining a maximum acceptable transmit power of the first wireless communication device based on the power parameter and based on the pathloss measurement;
  controlling the transmit power of the first wireless communication device, based on the maximum acceptable transmit power, when the first wireless communication device is connected to the base station,
  wherein the power parameter is Tx−PL−SNR,
  and wherein Tx is a transmit power of a second wireless communication device to the neighboring cell, PL is a pathloss of the second wireless communication device relative to the neighboring cell, and SNR is a target SNR of the neighboring cell.

2. A wireless communication base station comprising:
  a transceiver;
  a controller coupled to the transceiver,
  the controller configured to cause the transceiver to receive a power parameter from a neighboring cell,
  the controller configured to cause the transceiver to receive a pathloss measurement from a first wireless communication device, the pathloss measured between the first wireless communication device and the neighboring cell;
  the controller configured to determine a maximum acceptable transmit power of the first wireless communication device based on the power parameter and based on the pathloss measurement,
  the controller configured to control the transmit power of the first wireless communication device, based on the maximum acceptable transmit power, when the first wireless communication device is connected to the base station,
  wherein the power parameter is Tx−PL−SNR,
  wherein Tx is a transmit power of a second wireless communication device to the neighboring cell, PL is a pathloss of the second wireless communication device relative to the neighboring cell, and SNR is a target SNR of the neighboring cell.

* * * * *